Dec. 30, 1941.  J. DI CARLO  2,267,856
VEHICLE ATTACHED JACK
Filed July 15, 1940
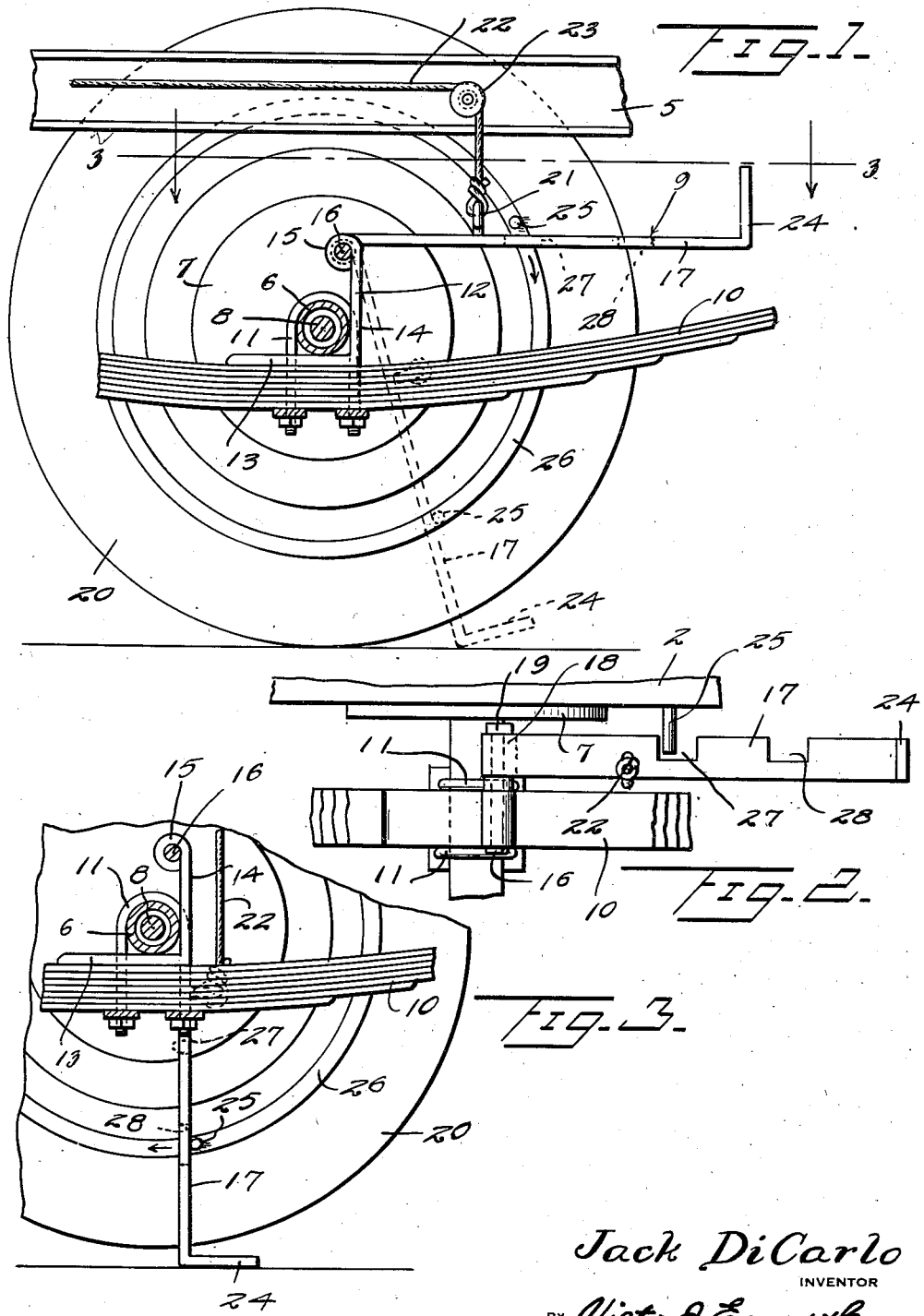
Jack DiCarlo
INVENTOR
BY Victor J. Evans & Co.
ATTORNEYS Patented Dec. 30, 1941

2,267,856

UNITED STATES PATENT OFFICE 2,267,856

VEHICLE ATTACHED JACK

Jack Di Carlo, Affton, Mo.

Application July 15, 1940, Serial No. 345,625

4 Claims. (Cl. 254—86)

The present invention relates to improvements in vehicle attached jacks.

An important object of the invention resides in the provision of a jack designed so as to be permanently attached to the vehicle and which may be readily and easily mounted on the vehicle structure, without the necessity of making extensive alterations in the construction of the vehicle to mount the jack.

Another object of the invention is to provide a vehicle attached jack adapted to be normally supported in a horizontal position adjacent the wheel of the vehicle and which cooperates with a portion of the wheel when moved to a nearly vertical position for lifting the vehicle. When in the horizontal or inactive position, the jack does not interfere with the normal action of the vehicle and the movement of its body in respect to its chassis.

The invention also consists in certain other features of construction and in the combination and arrangement of the several parts, to be hereinafter fully described and illustrated in the accompanying drawing and specifically pointed out in the appended claims.

In describing my invention in detail, reference will be had to the accompanying drawing wherein like characters denote like or corresponding parts throughout the several views, and in which:

Figure 1 is a view in side elevation of the improved jack attached to the vehicle.

Figure 2 is a top plan view thereof looking in the direction of the arrows 2—2 of Figure 1.

Figure 3 is a view similar to Figure 1 with the jack in operative position.

Referring to the drawing for a more detailed description thereof, a portion of the chassis of a motor vehicle is designated by the numeral 5, the axle casing is indicated by the numeral 6 having a wheel 7 driven by the axle 8. The jack or lifting device is generally designated by the reference numeral 9 and is shown associated with the axle casing 6. While only one wheel and one jack have been shown, it is to be understood that each wheel of the vehicle will be provided with a mechanism of the type particularly shown in Figure 1.

Motor vehicles are at the present time provided with semi-elliptic springs 10 clamped to the axle casing by means of a U-shaped bolt 11. The jack 9 includes a substantially L-shaped bracket 12 one leg 13 of which is fastened between the axle casing 6 and the upper leaf of the spring 10, said leg being held in position by the clamping action of the U-bolts 11. The other leg 14 of the bracket 12 is formed with a sleeve 15 for receiving a pin 16 for pivotally supporting the jack member 17. One end of the member 17 is formed with a sleeve 18 complementary to the sleeve 15 through which the pin 16 extends. A cap nut or the like 19 can be attached to the pin 16 for preventing its removal from the sleeves 15 and 18. By this construction, the jack member 17 is hingedly secured to the bracket 12 while being swingable on the pin 16.

The jack member 17 is of a length capable of supporting the vehicle wheel 7 and tire 20 lifted from the ground when disposed in a vertical position, as is shown in Figure 3 of the drawing, which permits removal of the tire and wheel. The jack member 17 is normally retained in a horizontal or inactive position the operation of which is controlled from a remote point in the vehicle. A lug 21 extends from the member 17 to which is attached one end of a flexible cable 22, said cable being trained over a pulley 23 attached to the chassis 5. The cable extends to a portion of the vehicle within convenient reach of the driver and is securely held for retaining the member 17 in a horizontal position. The outer end of the member 17 is formed with a foot portion 24 which extends at right angles to the member, said foot portion adapted to be supported on the ground when lifting the vehicle.

The invention further comprises the use of a pin or lug 25 which extends axially of the tire retaining rim 26, said pin or lug adapted to contact the member 17, and by rotation of the wheel in a reverse direction, move the member 17 to a vertical position. A pair of notches 27 and 28, respectively, are formed in the member 17, the notch 27 permitting passage of the lug 25 when the member is in its inactive or horizontal position, and the notch 28 permitting the passage of the lug when said member is in its vertical or operative position. Since the lug 25 is a permanent part of the rim 26, some means must be provided for permitting rotation of the wheel without contact of the lug with the member 17. The notches 27 and 28 accomplish this purpose.

In the use of the device, when desiring to support the axle with the wheel and tire clear of the ground, the cable 22 is released to permit the member 17 to move from the full line position to the dotted line position shown in Figure 1 of the drawing at which time the heel of the foot portion 24 will contact the ground. This position of the member 17 moves the notch 27 out of the path of travel of the lug 25. The vehicle is then shifted into reverse movement and by releasing the clutch slowly the wheel will be driven causing the lug 25 to contact the area between the notches 27 and 28 resulting in the urging of the member 17 to the vertical position at which time the lug 25 will be permitted to pass through the notch 28. By moving the car forward, the member 17 will be freed allowing it to be returned to its normal horizontal position.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In a vehicle including a frame, an axle, a spring beneath said axle, and wheels carried by the axle, an attached lifting jack including: a leg member normally disposed in a horizontal plane but adapted to be swung downwardly into contact with the ground for lifting the adjacent wheel, said leg member having a plurality of notches formed in one edge thereof, a substantially L-shaped bracket secured between said axle and spring, means for pivotally securing said leg member to said bracket, and a pin projecting from said wheel toward said leg member, said pin moving through one of said notches when said leg member is in a horizontal position and moving through another of said notches when said leg member is in a vertical position, said pin adapted to contact said leg member between said notches upon rotation of said wheel when said leg member has been dropped from its horizontal position for urging the same to a vertical position to lift said wheel from the ground.

2. In a vehicle including a frame, a wheel carrying axle, and a spring extending parallel with and inwardly of each wheel under the axle, a lifting jack comprising an angular bracket secured between the spring and the axle and extending upwardly therefrom, a jack leg forming bar having its inner end pivotally connected with the said bracket and disposed in a position intermediate the spring and the adjacent wheel, a roller mounted vertically at one side of the frame, and a flexible cable element trained over the roller and having one end attached to the intermediate portion of the jack leg, the said cable being operable to swing the jack leg from its depending position in engagement with the ground to support the wheel in elevated arrangement to a raised approximately horizontal inoperative position.

3. In a vehicle including a frame, a wheel carrying axle, and a spring extending below the axle parallel and adjacent each wheel, a lifting jack comprising an angular bracket having a horizontal leg clamped between the axle and the spring, the said bracket having an upstanding leg, a sleeve formed at the upper end of the said bracket supporting a transversely projecting pivot pin, a jack leg having its inner end connected to the said pivot pin operative to assume a vertically depending jacking position to lift the adjacent wheel from the ground and an elevated inoperative position, a vertically disposed roller supported on the vehicle frame and a cable trained over the said roller having one end attached to the intermediate portion of the jack leg for raising the latter to an approximately horizontal inoperative position.

4. In a vehicle including a frame, a wheel carrying axle, and a spring extending parallel with and inwardly of each wheel under the axle, a lifting jack comprising an angular bracket secured between the spring and the axle and extending upwardly therefrom, a jack leg forming bar having its inner end pivotally connected with the said bracket and disposed in a position intermediate the spring and the adjacent wheel, a roller mounted vertically at one side of the frame, the said jack leg forming bar having a pair of longitudinally spaced notches formed therein, and a pin rigidly connected with the wheel and extending laterally inward thereof, the said pin being movable through one of the notches of the bar when the jack leg is raised and through the other notch of the bar when the jack leg is in lowered position and engageable with the web of the jack bar between the said notches when the bar is in an intermediate position for moving the latter to an operative arrangement.

JACK DI CARLO.